UNITED STATES PATENT OFFICE.

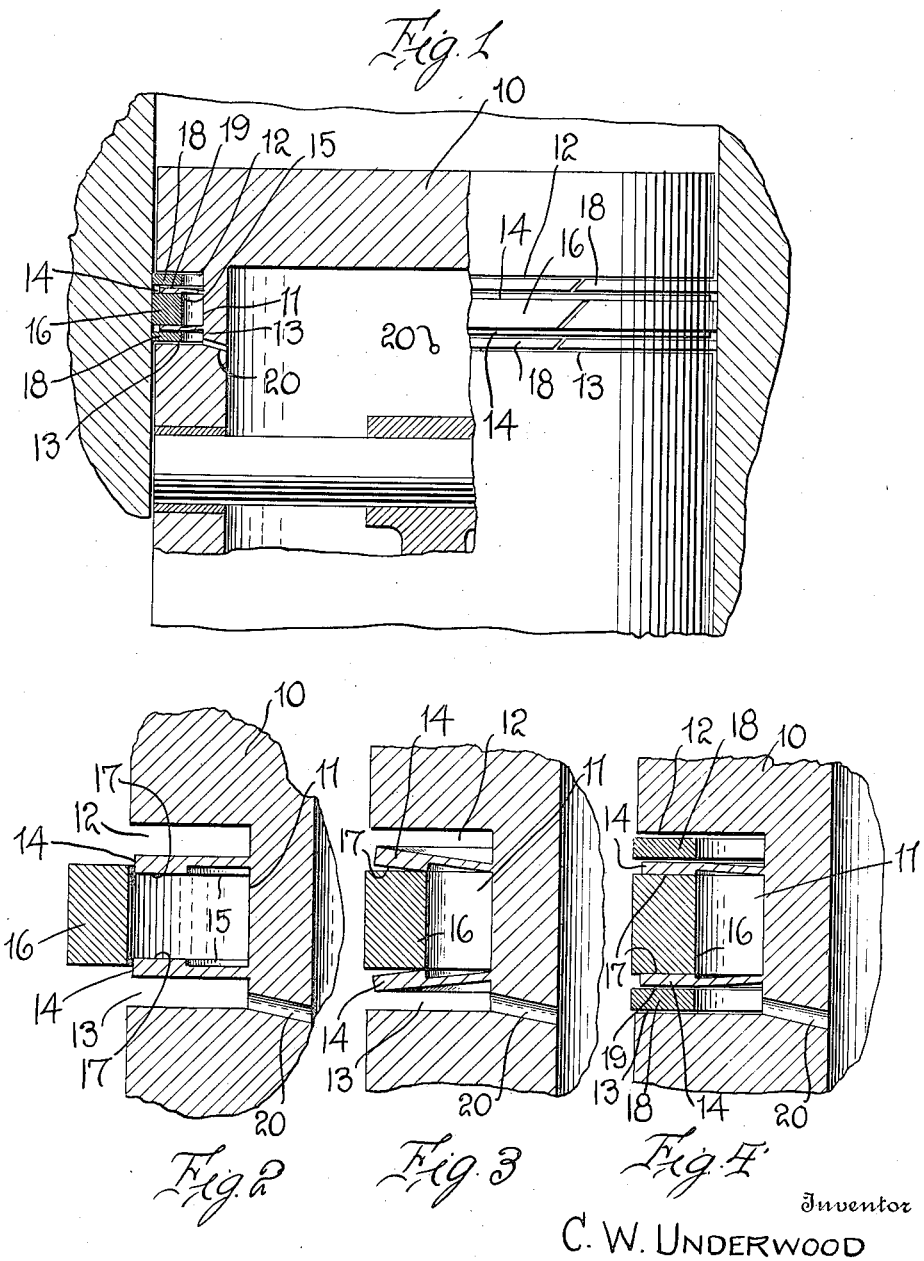

CHARLES W. UNDERWOOD, OF CROWLEY, LOUISIANA, ASSIGNOR OF SIX THIRTY-SIXTHS TO J. K. TOLER, TWO THIRTY-SIXTHS TO GUS E. FONTENOT, TWO THIRTY-SIXTHS TO J. S. MAUBOULES, TWO THIRTY-SIXTHS TO W. E. GRAY, ONE THIRTY-SIXTH TO T. J. TOLER, ONE THIRTY-SIXTH TO G. W. TOLER, ONE THIRTY-SIXTH TO F. M. FONTENOT, ONE THIRTY-SIXTH TO CLAUDE DE JERSEY, ONE THIRTY-SIXTH TO G. B. BROOKS, AND ONE THIRTY-SIXTH TO RUFUS W. FONTENOT, ALL OF CROWLEY, LOUISIANA.

PISTON FOR INTERNAL-COMBUSTION ENGINES.

1,224,239.  Specification of Letters Patent.  Patented May 1, 1917.

Application filed July 7, 1916. Serial No. 107,997.

*To all whom it may concern:*

Be it known that I, CHARLES W. UNDERWOOD, a citizen of the United States, residing at Crowley, in the parish of Acadia and State of Louisiana, have invented certain new and useful Improvements in Pistons for Internal-Combustion Engines, of which the following is a specification, reference being had to the accompanying drawings.

This invention relates to pistons, and particularly to the pistons of internal combustion engines. One of the problems of motor construction has been to secure proper lubrication of the pistons thereof and at the same time to prevent the lubricant from working up the skirt of the piston, past the head and into the firing chamber. Oil working into the firing chamber carbonizes and adheres to the valves and spark plug. This in a very short time greatly reduces the efficiency of the engine through poor combustion and faulty compression. Furthermore, the carbon so produced works between the wall of the cylinder and the piston causing a scoring of the cylinder walls and a wearing away or scoring of the piston rings.

For the purpose of preventing the passage of oil past the head of the piston, piston rings are used disposed in grooves, but the high speed at which the piston operates causes the oil to be forced into the piston ring grooves and around the piston rings and so on toward the head of the piston. Once the oil gets around the piston rings all control of the oil is lost and this excess oil passes into the combustion chamber and is carbonized as above described. Again the piston ring grooves of the usual piston have a width about .011 greater than the normal width of the piston ring itself when cooled, the ring being supposed to expand to that degree when heated. There is, however, always more or less play between the ring and the wall of the groove which permits not only the passage of oil as before stated, but causes a loss in compression and a loss of power during the explosion stroke.

It is the general object of my invention to avoid the objections above recited by providing means whereby the piston ring may have a tight joint with the walls of its groove while at the same time permitting the expansion of the piston ring under the action of heat and in this connection it is a further object to provide a resilient wall for one or both sides of the piston ring which wall when the ring expands yieldingly bears against the edge face of the ring and has a ground joint with it, thus absolutely preventing the passage of oil, combustion products, vapor or pressure around the piston ring.

A further object is to provide means for supporting this wall so that the wall will not unduly yield or break and to this end providing a small packing ring disposed in a groove on the opposite side of the wall from the main packing ring, this small packing ring having room just sufficient to expand to an extent which will compensate for the outward thrust of the resilient wall.

Other and more specific objects and advantages due to this invention will be stated later.

The invention is illustrated in the accompanying drawings, wherein,

Figure 1 is a sectional view of a cylinder with a piston operating therein provided with my improved piston rings, the piston and rings being broadly in section;

Figs. 2, 3 and 4 are enlarged fragmentary sectional views through the piston and rings showing the manner in which the rings are fitted into the piston.

Referring to these figures, 10 designates the piston of an internal combustion engine, this piston being constructed in any suitable manner. The wall of this piston is formed with a circumferential main groove 11 and on one or both sides of this main groove 11 there are provided the relatively narrow piston ring grooves 12 and 13. There is thus provided between the main groove 11 and each groove 12 or 13 a relatively thin wall 14, the periphery of which is below the level of the periphery of the body of the piston. As illustrated in Fig. 2 this wall 14 is under cut as at 15, the outer portion of the wall above the under cut 15 being of a depth equal to that of the main packing ring 16. The distance between one wall of the groove 11 and the opposite wall is originally less than the width of the ring 16 so that when the ring 16 is inserted in place, the wall 14 will be laterally deflected and will bear resiliently against the adjacent edge face of the packing ring 16. This resilience of the wall is secured by making the base of the wall 14 narrower than its periphery, that is, by undercutting the wall, this undercutting permitting the wall to yield sufficiently to accommodate the ring 16. The shifting of the wall 14 laterally from its initial position would bring the face 17 of the wall 14 into angular relation to the adjacent edge face of the ring 16, as shown diagrammatically in Fig. 3, in which of course the parts are greatly exaggerated. The face 17 of the wall 14 is, therefore, ground away by rotating the ring 16 against the face 17 until the face 17 is parallel to the face of the ring 16 when the wall 14 is sprung outward.

This resilient wall it will be seen permits the expansion and contraction of the ring 16 and bears against the edge face of the ring but it is necessary that the wall 14 shall be supported or reinforced as otherwise it would tend to bend unduly or break under the strain to which it is subjected. Hence I dispose within the groove 12 or 13 or in each of these grooves, when two grooves are used, a piston ring 18 which has the same depth as the piston ring 16 but is relatively thin. This ring 18 has a width .011 less than the distance between the outer wall of the groove 12 (or the groove 13) and the confronting face of the wall 14, thus permitting the ring 18 to expand and contract in the same manner that an ordinary piston ring does. It is obvious that as the wall 14 is flexed laterally by the ring 16, the face of the wall 14 which confronts the ring 18 will also have to be slightly beveled so that the contacting face will be parallel to the confronting face of the ring 18. This last named beveled face of the wall 14 is designated 19 in Fig. 4.

In practical use the expansion of the ring 16 will cause the flexure of the wall 14 and the ground joint between the face of the ring 16 and the face 17 is such as to absolutely prevent any passage of oil or products of combustion between the face of the ring 16 and the face 17 and so around the ring and will also prevent any loss of pressure whether on the compression stroke of the piston or on its working stroke. The expansion of the ring 18, which is also a split ring like the ring 16 and bears resiliently against the wall of the cylinder, supports the yielding wall 14 and prevents it from yielding too far.

Where three rings are used, as illustrated in Fig. 1 the ring in the groove 12 prevents any loss of compression while the ring in groove 13 assists in preventing oil passing up between the periphery of the piston and the inner face of the cylinder. In other words, this ring in groove 13 scavenges the oil. The main piston ring 16, because of its tight fit between the walls 14, also acts in preventing the loss of compression and preventing the passage of oil and in fact it is this ring 16 which is the main factor in this result.

I have found in practice that a piston constructed with the packing rings and grooves as above described absolutely prevents the lubricant from working up between the face of the piston and the face of the cylinder and into the firing chamber and to a very large extent prevents the scoring of the cylinder walls and reduces wear on the piston rings. The main piston ring assisted by the lower ring 18 scrapes the oil back into the crank case upon the outward movement of the piston wall at the same time permitting ample lubrication of the piston. In order to prevent excess oil gathered within the groove 13 from working around the piston ring 18 therein, I may provide the groove 13 with a plurality of passages 20 leading into the interior of the piston so that the excess oil will pass back into the interior of the piston and thence into the crank case.

In Fig. 2 I have shown diagrammatically walls 13 and 14 as they are originally formed and before the insertion of the main piston ring between the walls. It will be seen from this figure that the width of the main piston ring is greater than the distance between the faces 17. When the ring is forced in, therefore, these walls 13 and 14 will be forced laterally as shown in Fig. 3, and the faces 17 will be disposed at an acute angle to the confronting faces of the piston ring. When the faces are ground, however, to a proper fit they will bear flat against the confronting faces of the main piston ring. It will be seen also from Fig. 3 that the faces confronting the secondary piston rings 18 will also have to be cut or faced in order that the upper portion of the walls 13 and 14 may bear flat against the rings 18. It will be understood of course that Figs. 2, 3 and 4 are very largely diagrammatic for the reason that the amount of deflection of the walls 14, the amount of facing necessary, and the angle of the walls is extremely slight and hardly evident except on measurement with instruments of precision.

While I have described this device as being particularly adapted to the pistons of internal combustion engines, I wish it of course understood that it may be used under other circumstances as, for instance, in air compressing pumps or steam engines.

What I claim is:—

1. A piston having a main piston ring groove and a groove extending parallel to but spaced a relatively slight distance from the main groove to define between them a relatively thin wall, and a piston ring disposed in the main groove and which by expansion under heat will deflect said wall to thereby secure close engagement between the adjacent faces of the wall and ring.

2. A piston having a main piston ring groove and a groove extending parallel to but spaced a relatively slight distance from the main groove to define between them a relatively thin wall, and a piston ring disposed in the main groove which by expansion under heat will deflect the wall and thereby secure close contact between the confronting faces of the wall and ring, said thin wall being undercut to reduce the width of its attachment to the body of the piston to thereby increase its resilience.

3. A piston having a main piston ring groove and a groove extending parallel to but spaced a relatively slight distance from the main groove to define between them a relatively thin wall, and a piston ring disposed in the main groove and which by expansion under heat will deflect said wall and thereby cause a close contact between the face of the wall and the confronting face of the piston ring, said confronting faces of the ring and wall being ground.

4. A piston having a main piston ring groove, a groove extending parallel to and spaced a relatively slight distance from the main groove to define between them a relatively thin yieldable wall, a main piston ring disposed in the main groove and which by expansion under heat will deflect the wall to thereby secure close contact between the face of the wall and the confronting face of the piston ring, and a secondary piston ring supported in the second named groove and having a width normally less than the width of said groove, said secondary ring acting when expanded as a support for the yieldable wall.

5. A piston having a main piston ring groove and a pair of grooves on each side of the main groove extending parallel thereto but spaced a relatively slight distance therefrom to define between each secondary groove and the main groove a relatively thin yieldable wall, a main piston ring disposed in the main groove and which by expansion under heat will deflect the walls to thereby secure close contact between the side faces of the piston ring and the confronting faces of said yieldable walls, and secondary piston rings disposed in said secondary grooves and less in width than said grooves whereby when said secondary rings expand they will support each its corresponding wall.

In testimony whereof I hereunto affix my signature in the presence of two witnesses.

CHARLES W. UNDERWOOD.

Witnesses:
FREDERIC B. WRIGHT,
H. M. CLARK.